April 5, 1927.
T. L. CAVALLI
1,623,909
PASTEURIZER
Filed June 19, 1926
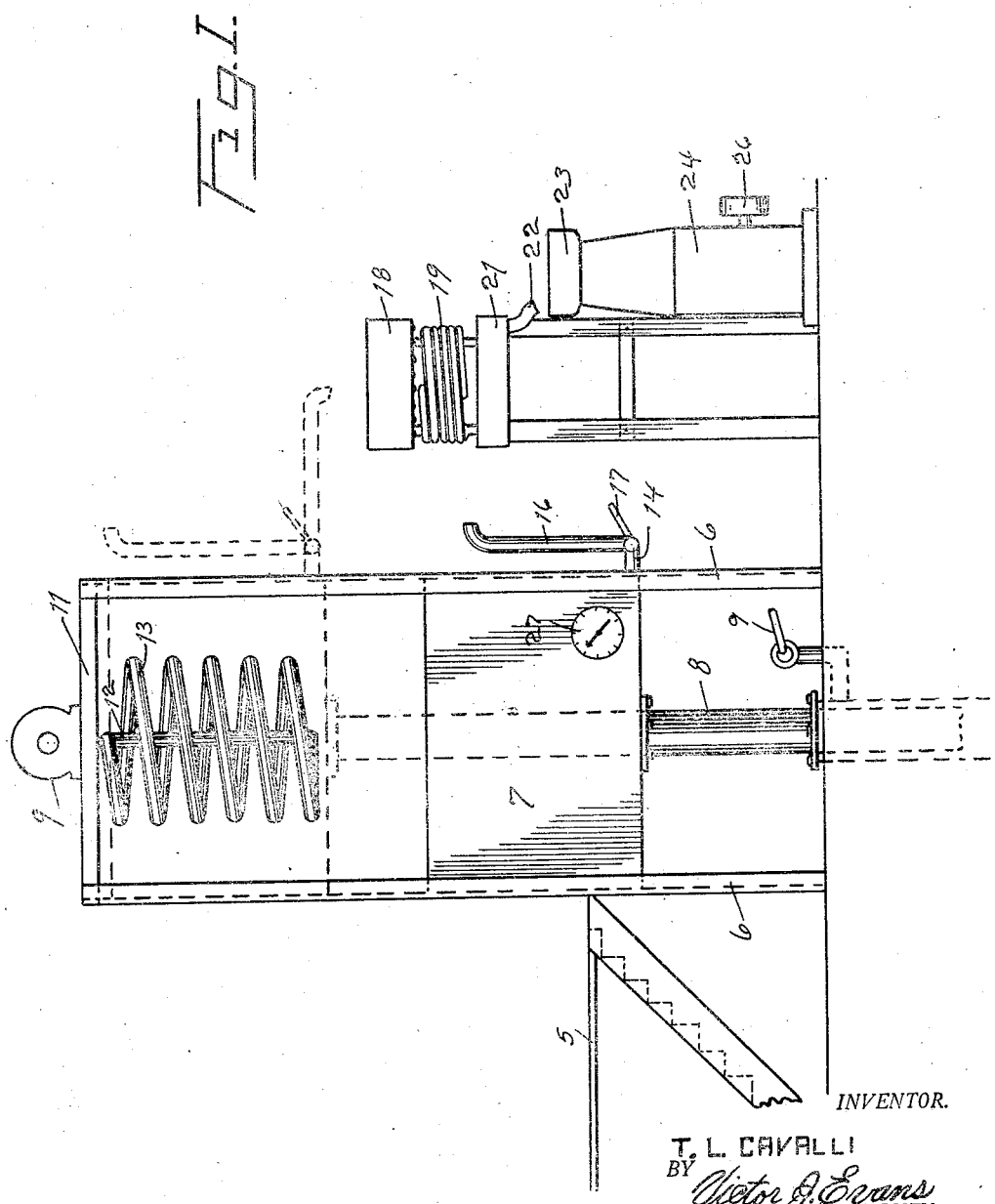
INVENTOR.
T. L. CAVALLI
BY *Victor J. Evans*
ATTORNEY Patented Apr. 5, 1927.

1,623,909

UNITED STATES PATENT OFFICE.

TITO L. CAVALLI, OF BENICIA, CALIFORNIA.

PASTEURIZER.

Application filed June 19, 1926. Serial No. 117,126.

This invention relates to improvements in Pasteurizers.

The principal object of this invention is to produce a Pasteurizer which can be easily cleaned.

Another object is to produce a Pasteurizer wherein the labor incident to the Pasteurizing process is greatly reduced.

A further object is to produce a Pasteurizer wherein pumps commonly employed in elevating the milk will be eliminated.

Other objects and advantages will be apparent during the course of the following description.

In the accompanying drawings forming a part of this specification and in which like numerals are employed to designate like parts throughout the same The figure illustrates my invention.

In Pasteurizing milk it has been common to place the milk in a vat within which a coil is journaled. The journals for this coil project through the sides of the vat and are provided with stuffing boxes, which become traps for bacteria liable to form in milk. Moreover the coils in this type of vat are almost impossible to thoroughly cleanse, even when live steam is turned on them because of the fact that the casein in the milk adheres to the outer surface of the coils and the steam merely bakes this casein onto the coils thereby reducing their efficiency, and at the same time, creating a germ breeding bed.

I have overcome these difficulties by providing a vat which is vertically movable and by suspending the heated coil above the vat the same may be immersed or withdrawn from the contents of the vat by simply elevating or lowering the vat.

In the accompanying drawings wherein for the purpose of illustration is shown a preferred embodiment of my invention, the numeral 5 designates the customary loading platform upon which the milk cans are placed for delivery from the source of supply. Adjacent this vat I have positioned a plurality of angularly shaped uprights or guides 6 preferably four in number.

At 7 I have shown a vat vertically slidably in the guides 6 and at 8 I have shown a hydraulic jack of the customary construction, while at 9 I have shown a valve for admitting fluid beneath the jack, or for withdrawing fluid therefrom. Mounted upon the uprights 6 is a platform 11 carrying thereon a motor 9 which is connected by gearing not shown to a tubular shaft 12. This shaft is connected to a tubular coil 13 through which a heating or cooling medium may be circulated in the customary manner.

The bottom of this coil is at a point above the top of the vat when the vat is lowered to a filling position as shown in the drawing.

This vat carries a discharge pipe 14 and a spout 16 pivoted thereto, while a valve 17 controls the flow of liquid from the vat 7 to the spout 16.

At 18, I have shown a receiving tank having a plurality of openings in the bottom thereof, through which openings the liquid received in the tank 18 is discharged over a cooling coil 19. From the cooling coil the liquid passes into a receiver 21 and is discharged from there through a spout 22 into the tank 23 of the conventional cream separator 24, which may be driven in any convenient manner as by a belt passing over the pulley 26.

A temperature gauge is indicated at 27 and is preferably secured to the side of the vat 7.

The manner of employing my Pasteurizer is as follows:—

The milk received upon the platform 5 is poured into the vat 7 after which the valve 9 is rotated so as to discharge fluid beneath the customary jack 8 with the result that the jack pushes the vat upwardly until it assumes the position shown in dotted lines. This causes the coil 13 to be immersed in the milk within the vat, after which the motor 9 is started and a heating medium caused to circulate through the coil 13. The heat from this coil is dissipated throughout the milk within the vat and the user can ascertain by viewing the gauge 27 exactly the temperature of the contents of the vat.

As soon as the required temperature for Pasteurizing has been reached the heating medium is cut off and a cooling medium is turned on through the coil 13. This immediately starts the lowering of the temperature of the milk within the vat, and after the same has reached a pre-determined temperature the spout 16 is turned to its discharging position as shown in dotted lines and the valve 17 manipulated so that the milk discharges into the tank 18 from which point the milk passes over the cooling coils 19 and thence to the cream separator and is there handled in the customary manner.

With this construction it is not necessary to employ pumps which are otherwise necessary in order to elevate the milk to the top of the cooler or to any other points to which the milk would have to be elevated.

The use of a pump is objectionable in that they are hard to clean besides the time lost in assembling and disassembling for the cleaning operation. With my device it will be seen that it is unnecessary to employ any apparatus which cannot be readily cleaned and one which will minimize the amount of work incident to the handling of large quantities of milk.

It is to be understood that the form of my invention herewith shown and described is to be taken as a preferred example of the same and that various changes relative to to the size, shape and arrangement of parts may be resorted to without departing from the spirit of the invention, or the scope of the subjoined claim.

Having thus described my invention, I claim:—

In a Pasteurizing apparatus, a hydraulic jack, a vat supported on said jack and adapted to be elevated thereby, angularly-shaped uprights positioned adjacent the corners of said vat, a platform positioned adjacent the upper end of said uprights, a motor positioned on said platform, a coil suspended from said platform and adapted to be rotated by said motor, said coil being tubular so as to receive a flow of liquid therethrough, and means for discharging the liquid from said vat, and a valve positioned therein for the purpose described.

In testimony whereof I affix my signature

TITO L. CAVALLI.